Figure 1:
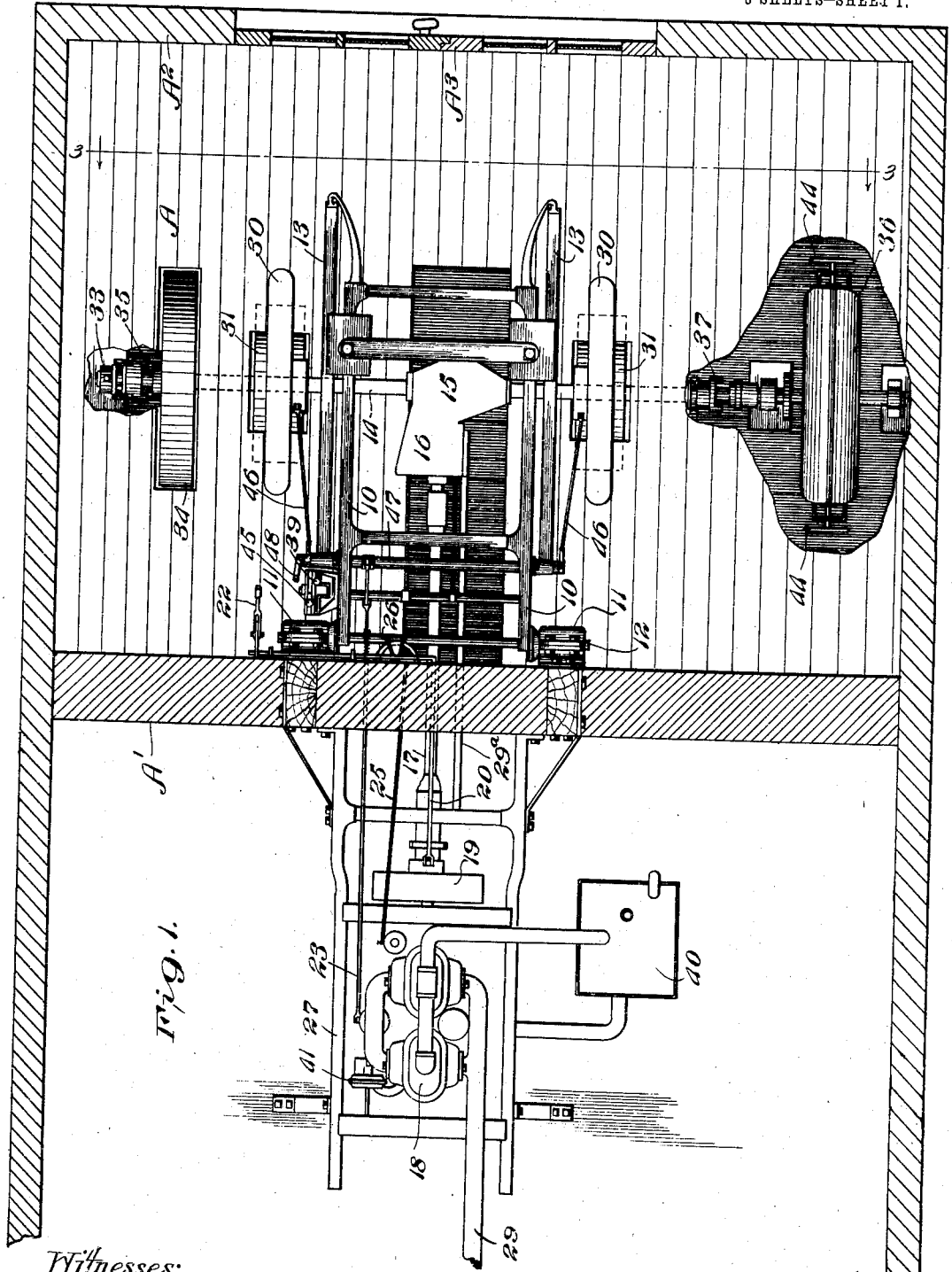

F. F. BEALL.
TESTING APPARATUS.
APPLICATION FILED APR. 24, 1911.

1,044,121.

Patented Nov. 12, 1912.

3 SHEETS—SHEET 1.

Witnesses:
L. Hockinson
C. S. Brown.

Inventor:
Frank F. Beall
By Foster Freeman Watson & Coit
Attorneys

F. F. BEALL.
TESTING APPARATUS.
APPLICATION FILED APR. 24, 1911.

1,044,121.

Patented Nov. 12, 1912.

3 SHEETS—SHEET 3.

Witnesses:
L. Hoskinson
C. S. Brown

Inventor:
Frank F. Beall
By Foster Freeman Watson Coit
Attorneys

UNITED STATES PATENT OFFICE.

FRANK F. BEALL, OF DETROIT, MICHIGAN, ASSIGNOR TO PACKARD MOTOR CAR COMPANY, OF DETROIT, MICHIGAN, A CORPORATION OF MICHIGAN.

TESTING APPARATUS.

1,044,121.

Specification of Letters Patent.

Patented Nov. 12, 1912.

Application filed April 24, 1911. Serial No. 623,063.

*To all whom it may concern:*

Be it known that I, FRANK F. BEALL, a citizen of the United States, and resident of Detroit, county of Wayne, State of Michigan, have invented certain new and useful Improvements in Testing Apparatus, of which the following is a specification.

One of the desiderata in a motor car is quietness of action of the necessary machinery, principally the engine, change speed gears, and the differential gearing. The engine may be tested and adjusted by itself, but the gearing can only be tested properly when driven by an engine similar to the motor with which it is to be operated and under conditions simulating the ordinary road conditions which are met with in driving cars. It is found difficult to test the gearing, especially for silence, when operating the same directly by an explosion motor on account of the noise of the exhaust and noises due to the vibration of the engine frame, the operation of the train of minor gears which run the pump, magneto, and the cam shaft for operating the valves.

The object of the present invention has been to provide an apparatus whereby the change speed gearing, differential gearing, brakes, rear axle bearings and other associated parts may be tested for accuracy of adjustment and quiet running under conditions closely approximating actual road conditions while operated by a motor of the kind with which they are to be used, but with the noise and jar of the motor eliminated. In accomplishing this object I have provided what may be termed a quiet room or vault in which the gearing and its testing apparatus are located and an engine suitably supported in an adjacent compartment, or outside of the room, the engine being controlled by suitable connections passing through the wall of the quiet room and the power being transmitted into the room by a shaft passing through the wall. The walls of the room are of such thickness that the noise of the engine is practically excluded and the apparatus within the room enables the operator to control the speed of the engine, and the load upon the driving axle and to produce the various conditions encountered in running on a level or up and down various grades without leaving the room. The adjustment and running of the gearing, axle bearings, etc., can thus be thoroughly tested and any inaccuracy corrected.

Figure 2:
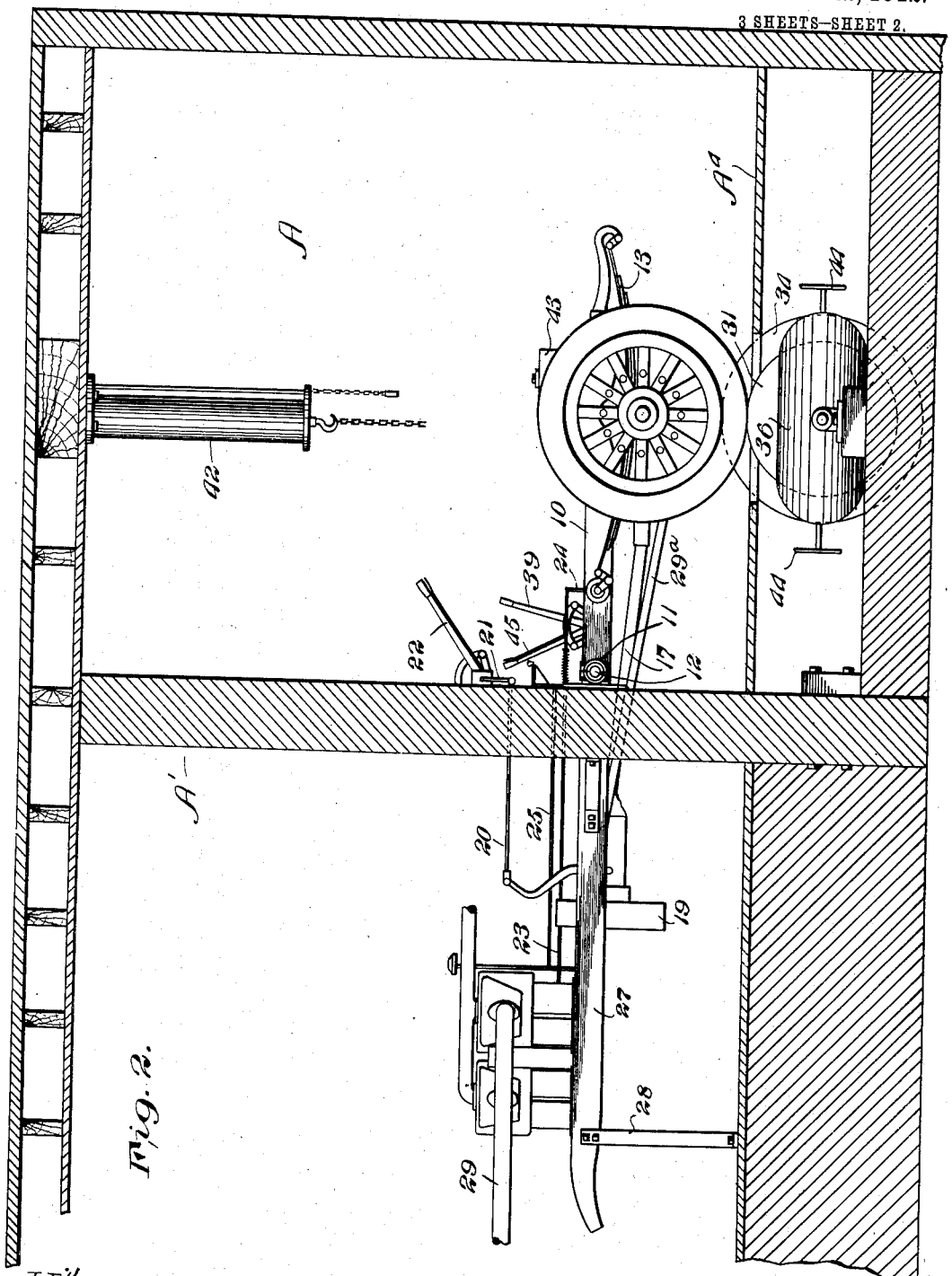
Figure 3:
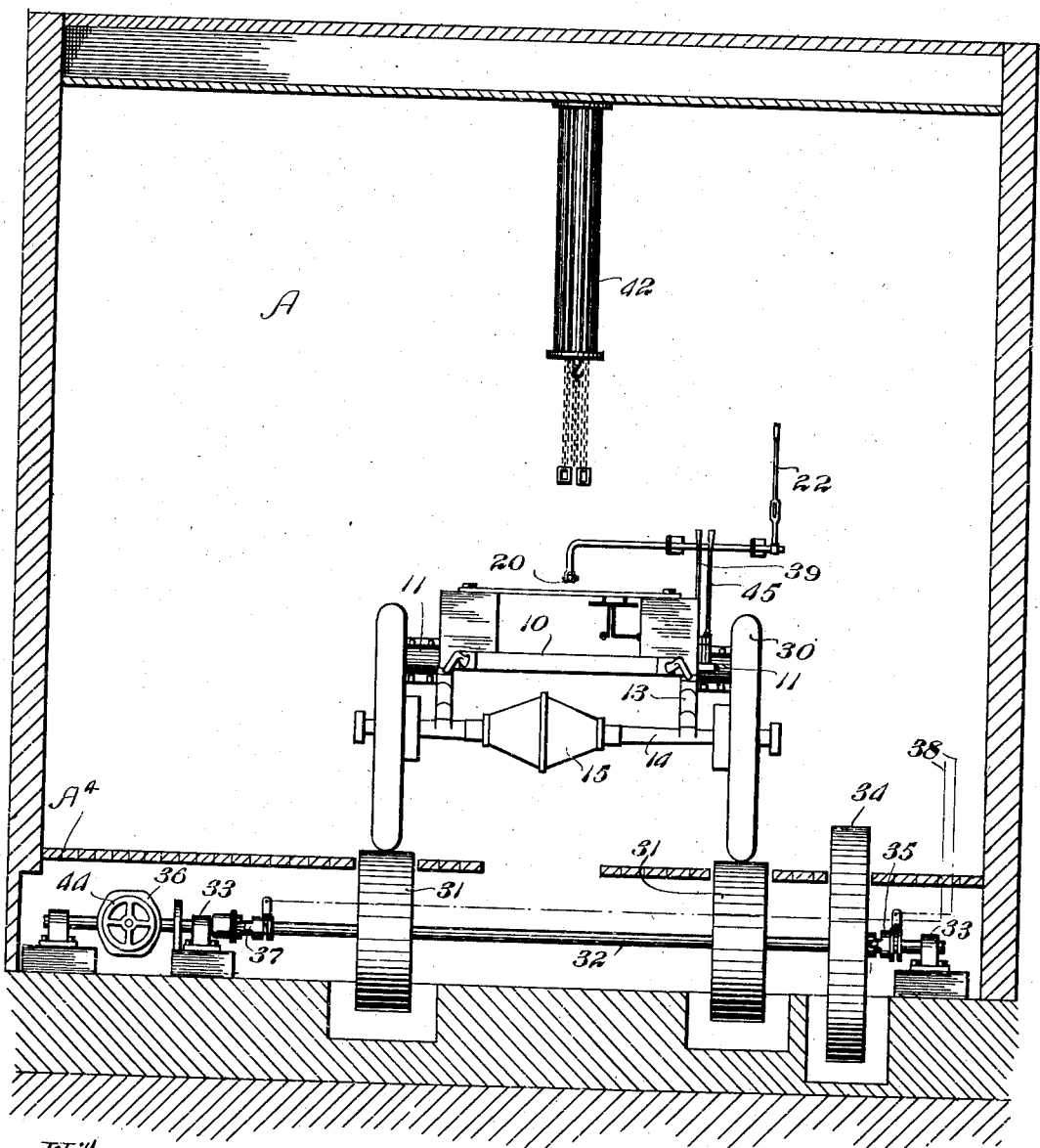

The invention will be described in connection with the accompanying drawings, in which:

Figure 1 is a plan view of the apparatus embodying the invention, the walls of the quiet room being shown in section and a portion of the floor being broken away. Fig. 2 is a side view of the apparatus, the walls and floor of the room being shown in section, and Fig. 3 is a section on the line 3—3 of Fig. 1.

Referring to the drawing A indicates the quiet room which is inclosed on all sides by walls of suitable material to exclude noises. One of these walls, A', may be termed a partition wall as it divides the dummy vehicle into two parts, as will be hereinafter described. Another wall, $A^2$ is provided with a suitable door $A^3$ through which the machinery to be tested may be introduced and removed.

A frame 10, similar to the rear portion of the frame of a motor car is hinged at its forward end to bearings 11 which are secured to the partition wall A'. As shown the frame is provided with a transverse shaft 12 mounted in these bearings. The rear portion of the frame is supported on the usual springs 13 which rest upon the automobile axle 14. It will be understood that the frame is a part of the permanent equipment of the quiet room, while the axle, including the gearing through which it is driven, is temporarily connected with the frame and springs in any suitable manner and is replaced by successive axles as they come up for test. Associated with each axle is the usual differential gear casing 15, and ordinarily, the change speed gear casing 16. In some machines the change speed gear casing is separate from the differential casing. I have used for illustration the rear axle of the well known Packard motor car in which the change speed and differential gears are contained in a single casing, or in two casings which are practically a single casing.

The gearing in the casings 15, 16 is driven by a shaft 17 passing through the partition wall, the said shaft being operated by the gasolene engine 18 through the usual clutch 19. The clutch is controlled by a rod 20 extending back into the quiet room, the rod being connected with the arm 21 of a rock shaft which is operated by a clutch lever 22 in the room A.

The throttle valve of the motor is operated by a rod 23 extending through the partition A' and connected to an arm 24 of a rock shaft 47. The rod 23 is jointed as shown in Fig. 1 so that it will fold when the frame 10 is raised. The rock shaft 47 is provided with a lever 48 for operating the throttle. The timer is controlled by a second rod 25 extending through the partition A' and connected to a hand lever 26. All of these parts are shown more or less diagrammatically, it being understood that they are of ordinary construction such as is commonly used in motor cars. The engine, clutch, and associated parts are mounted on a frame 27 which is stationary, but which is otherwise the equivalent of the forward part of the frame of a motor car. As shown the frame is supported on standards 28 and the exhaust pipe 29 of the engine is directed forward instead of rearward. The exhaust may be suitably muffled or carried to some distance from the apparatus. I have shown the radius rod 29$^a$ as passing through the wall, an opening to receive it being provided. It is understood that the openings through the wall are just sufficient to receive the parts passing through, no substantial openings through which air vibrations may be carried being permitted.

The rear axle is mounted on the usual motor vehicle wheels 30 and these wheels are supported on rollers 31 on a transverse shaft 32 mounted in bearings 33 in a pit under the floor A$^4$ of the quiet room, the rollers being preferably of such diameter as to extend up to or through the floor. On the shaft 32 is a fly wheel 34 which is free to rotate independently of the shaft, but which may be connected with the shaft at will by means of a clutch 35. A suitable brake mechanism 36 may also be connected with or disconnected from the shaft 32 by means of a clutch 37. Connections 38, shown diagrammatically, extend from the clutches up into the room for the convenient operation of the clutches. The gears may be shifted in the usual manner to produce different speeds and to reverse the movement of the driving wheels by the usual lever, indicated by the number 39. 40 indicates a water tank for supplying the water cooling system of the motor and 41 indicates the water pump. The wheel brakes, which are of usual construction, are operated by the usual lever 45 and connections including the rock shaft and links 46.

A suitable lift 42 is provided for raising the rear part of the movable frame 10 to facilitate the introduction and removal of rear axle structures, or "bridges" as they are often termed. This lift may also be used to raise the weights which are provided for loading the frame to cause the wheels to bear heavily on the rollers 31. 43 indicates a weight for this purpose, which may be equal to the weight of the usual automobile body and one or more passengers.

The various means located in the quiet room for controlling the speed and power of the motor are indicated on the drawings more or less diagrammatically. It is to be understood, however, that the apparatus in the quiet room may include every device usually provided in motor cars for controlling the motor and the brakes and any additional devices which may be found desirable for testing purposes.

In operation the frame 10 is raised and a rear axle structure or "bridge," including the gear casings and all of the change speed and differential gears, is adjusted to the frame in exactly the same relation that they are to bear to the frame of the vehicle for which they are designed. The frame with its load is then lowered and the wheels carrying the full load rest on the rollers 31. The drive shaft 17 is connected up to the gearing in the usual manner. The operator, without leaving his position in the quiet room may then run the engine at any speed desired and by using the change speed and reverse gears may drive the road wheels at different speeds forward, relatively to the engine speed, and at the usual speed backward. By manipulating the clutch 35 he can connect the fly wheel with the roller shaft 32, and by throwing out his clutch 19 when the shaft is run rapidly the momentum of the fly wheel will cause the rollers 31 to continue to drive the road wheels, thus simulating the operation of a motor car in coasting or in running freely on a level. By throwing in the clutch 37 any desired resistance to the movement of the rollers 31 may be obtained, and by driving the road wheels with the brake 36 in operation the effect of climbing hills of different grades may be obtained. It will be understood that the brake resistance may be adjusted at will. In the drawing a hydraulic brake is illustrated diagrammatically, the same being controlled by valve wheels 44.

By the use of the quiet room and the equipment above described I am enabled to detect minor noises and defects in adjustment of the gears, brakes, and rear axle bearings which would not be possible to detect in an assembled car or under conditions in which the gearing and engine were operating in the same room or space, and I am also able to make the necessary adjustments more rapidly on account of the ease with which defects may be detected. It will be understood that the walls of the quiet room and the floor on which the roller shaft is mounted are preferably constructed of concrete, brick or other non-resonant material.

Having thus described my invention what I claim as new and desire to secure by Letters-Patent is:

1. The combination with a room, of means arranged within the room for testing gearing, an engine arranged outside of the room, a power shaft extending through one of the walls of the room from the engine to the gearing, and controlling means extending through the wall whereby an operator in the room may control the speed of the engine.

2. A room inclosed by suitable noise-excluding walls and provided with suitable apparatus for testing the gearing and rear axle structure of an automobile, in combination with an engine located outside of the room, a power shaft extending through one of the walls for communicating power from the engine to the gearing and the rear axle, and control mechanism extending from the room through the wall to the engine for controlling the speed and power thereof.

3. A testing apparatus for automobile rear axle structures comprising a room inclosed by suitable walls, a frame permanently mounted in said room, rollers below the frame, said frame being adapted to have a rear axle structure connected thereto with the rear wheels resting on said rollers, an explosion motor outside of the room, means for transmitting power from the motor to the rear axle structure including a shaft passing through one of the walls of the room, and means extending through said wall for controlling the motor, whereby an operator within the room may drive the motor at different speeds and thus operate the rear axle gearing and wheels at different speeds, as desired.

4. A testing room for automobile rear axle structures inclosed by suitable walls and provided with a frame to which a rear axle structure may be connected, a shaft having rollers upon which the rear axle and its wheels may be supported, a brake device and momentum wheel on said shaft, and means for controlling a motor, in combination with a motor arranged outside of the room, a power shaft extending through one of the walls of the room from said motor, and connections from said motor to the controlling means.

5. A room for testing automobile rear axle structures having suitable walls for excluding noises, in combination with a frame permanently mounted within the room, springs supporting said frame and adapted to have connected therewith, a rear axle structure to support the springs and frame, and roller supports for the wheels of the rear axle whereby the wheels may be rotated, an explosion motor outside of the room, means for transmitting power through one of the walls of the room from the motor to the rear axle structure, and controlling means extending through said wall whereby the motor may be controlled by an operator within the room.

6. A room for testing rear axle gearing etc. inclosed by suitable walls, a frame similar to the rear portion of an automobile frame and adapted to have a differential and change speed gearing and a rear axle connected therewith, said frame having its forward end pivotally connected to fixed supports within said room, an explosion motor located outside of the room, a power shaft extending from the motor through a wall of the room for driving the gearing and rear axle, and means within the room for controlling the motor.

7. In a testing apparatus for automobile rear axle structures, the combination with a wall adapted to exclude sound, of a dummy vehicle comprising a frame having its rear portion on one side of said wall and its forward portion on the other side thereof, an explosion motor arranged on the forward part of the frame, and controlling mechanism for said motor arranged on the rear part of the frame, a power shaft extending through the wall, said power shaft and the rear part of said frame being adapted to have a rear axle structure connected therewith, whereby the noise and vibration of the motor may be excluded while testing the rear axle structure.

8. In an apparatus for testing rear axle structures of automobiles, a room inclosed by suitable walls, a vertically movable frame in said room adapted to have a rear axle structure connected therewith, means for raising and lowering said frame, a motor situated outside of the room, and means extending through a wall of the room whereby the motor may be controlled from within the room, and the rear axle and its driving gearing may be operated from the motor.

In testimony whereof I affix my signature in presence of two witnesses.

FRANK F. BEALL.

Witnesses:
EDWARD McDONALD,
BERTRAM W. BENTSELL.